US012617339B2

(12) United States Patent
Sano et al.

(10) Patent No.: US 12,617,339 B2
(45) Date of Patent: May 5, 2026

(54) DRIVER MONITORING DEVICE, DRIVER MONITORING METHOD, AND NON-TRANSITORY RECORDING MEDIUM

(71) Applicants:TOYOTA JIDOSHA KABUSHIKI KAISHA, Toyota (JP); DENSO CORPORATION, Kariya-city (JP)

(72) Inventors: Masataka Sano, Tokyo (JP); Hiromi Nemoto, Tokyo (JP); Yutaro Tsugawa, Tokyo (JP)

(73) Assignees: TOYOTA JIDOSHA KABUSHIKI KAISHA, Toyota (JP); DENSO CORPORATION, Kariya-city (JP)

( * ) Notice: Subject to any disclaimer, the term of this patent is extended or adjusted under 35 U.S.C. 154(b) by 164 days.

(21) Appl. No.: 18/522,900

(22) Filed: Nov. 29, 2023

(65) Prior Publication Data

US 2024/0262288 A1 Aug. 8, 2024

(30) Foreign Application Priority Data

Feb. 7, 2023 (JP) ................................. 2023-016924

(51) Int. Cl.
*B60Q 9/00* (2006.01)
(52) U.S. Cl.
CPC ..................................... *B60Q 9/00* (2013.01)

(58) Field of Classification Search
CPC ................. B60W 40/08; B60W 50/14; B60W 2050/143; B60W 2050/146; B60W 2540/225; B60W 2540/229; B60Q 1/46; G06V 20/597; G08B 21/182
See application file for complete search history.

(56) References Cited

U.S. PATENT DOCUMENTS

| | | | | | |
|---|---|---|---|---|---|
| 2014/0266655 | A1* | 9/2014 | Palan | ................... | G06V 20/597 |
| | | | | | 340/435 |
| 2019/0147267 | A1* | 5/2019 | Aizawa | ................. | B60W 50/00 |
| | | | | | 340/576 |
| 2019/0147272 | A1 | 5/2019 | Yokota et al. | | |
| 2022/0048499 | A1* | 2/2022 | Yang | ..................... | B60W 10/18 |
| 2023/0066670 | A1* | 3/2023 | Yasuda | ................. | B60W 40/08 |

FOREIGN PATENT DOCUMENTS

| | | | |
|---|---|---|---|
| JP | H03-167698 | A | 7/1991 |
| JP | H06-243367 | A | 9/1994 |
| JP | 2000-020897 | A | 1/2000 |
| JP | 2008-217693 | A | 9/2008 |
| JP | 2019-087017 | A | 6/2019 |
| JP | 2019-091275 | A | 6/2019 |

* cited by examiner

*Primary Examiner* — Ig T An
(74) *Attorney, Agent, or Firm* — Dinsmore & Shohl LLP

(57) ABSTRACT

The driver monitoring device includes a judgment part configured to judge whether a driver of a vehicle is driving distracted by a predetermined judgment criteria based on an image generated by an imaging device capturing a face of the driver, a notification part configured to issue a warning to the driver when it is judged that the driver is driving distracted, and a change part configured to change the judgment criteria when an emergency warning light mounted in the vehicle is turned on.

9 Claims, 5 Drawing Sheets

DRIVER MONITORING DEVICE, DRIVER MONITORING METHOD, AND NON-TRANSITORY RECORDING MEDIUM

This application claims priority to Japanese Patent Application No. 2023-016924 filed Feb. 7, 2023, the entire contents of which are herein incorporated by reference.

FIELD

The present disclosure relates to a driver monitoring device, a driver monitoring method, and a non-transitory recording medium.

BACKGROUND

PTL 1 describes to issue a warning to a driver by a buzzer sound etc., when it is judged that the driver is in a distracted driving state based on an image of a CCD camera capturing the driver.

PTL 2 describes to judge that the driver is not driving distracted when the vehicle is in a state with the steering wheel being operated, in a state moving backward, or in a stopped state.

PTL 3 describes to temporarily switch a judgment condition for judging distracted driving of a driver during an operating period of a turn signal.

PTL 4 describes judging that a vehicle is liable to drive off a running section when a condition showing that the driver is intentionally trying to change a running lane does not stand and it is judged that the vehicle is approaching a solid lane line, and judging whether a condition showing that the driver is intentionally trying to change a running lane stands based on an on/off state of a winker and hazard light.

CITATION LIST

Patent Literature

[PTL 1] Japanese Unexamined Patent Publication No. 03-167698
[PTL 2] Japanese Unexamined Patent Publication No. 06-243367
[PTL 3] Japanese Unexamined Patent Publication No. 2019-091275
[PTL 4] Japanese Unexamined Patent Publication No. 2000-020897

SUMMARY

Technical Problem

As described in PTL 1, by issuing a warning about distracted driving of a driver, it is possible to prompt the driver to pay attention to the road ahead and in turn improve the safety of a vehicle.

However, in a situation where an emergency warning light is turned on in a vehicle, the driver has to look in the side direction to determine the surrounding situation. If a warning is issued for such a suitable action, determination of the surrounding situation by the driver will be obstructed or the driver is liable to be irritated by the warning.

Therefore, in view of this problem, an object of the present disclosure is to suppress unnecessary warnings when issuing warnings about distracted driving of a driver.

Solution to Problem

The summary of the present disclosure is as follows.

(1) A driver monitoring device comprising a processor configured to: judge whether a driver of a vehicle is driving distracted by a predetermined judgment criteria based on an image generated by an imaging device capturing a face of the driver; issue a warning to the driver when it is judged that the driver is driving distracted; and change the judgment criteria when an emergency warning light mounted in the vehicle is turned on.

(2) The driver monitoring device described in above (1), wherein the processor is configured to detect an angle of a facial orientation or line of sight of the driver based on the image, judge that the driver is driving distracted when the angle satisfies a predetermined distracted driving judgment condition, and change the distracted driving judgment condition when the emergency warning light is turned on.

(3) The driver monitoring device described in above (2), wherein the distracted driving judgment condition is that the angle is outside a threshold value range for greater than or equal to a threshold value time period, and the processor is configured to lengthen the threshold value time period or broaden the threshold value range when the emergency warning light is turned on.

(4) The driver monitoring device described in above (1), wherein the processor is configured to change the judgment criteria so that whether the driver is driving distracted is not judged when the emergency warning light is turned on.

(5) The driver monitoring device described in any one of above (1) to (4), wherein the processor is configured to change the judgment criteria based on at least one of positional information and peripheral information of the vehicle when the emergency warning light is turned on.

(6) The driver monitoring device described in above (5), wherein the processor is configured to change the judgment criteria so that it becomes harder to judge that the driver is driving distracted when the vehicle is running on a highway compared to when the vehicle is not running on a highway.

(7) The driver monitoring device described in above (5), wherein the processor is configured to change the judgment criteria so that it becomes harder to judge that the driver is driving distracted when the number of peripheral vehicles located around the vehicle is large compared to when the number of the peripheral vehicles is small.

(8) The driver monitoring device described in above (5), wherein the processor is configured to change the judgment criteria so that it becomes harder to judge that the driver is driving distracted when there is a stationary object present ahead of the vehicle compared to when there is no stationary object present ahead of the vehicle.

(9) A driver monitoring method performed by a computer, comprising: judging whether a driver of a vehicle is driving distracted by a predetermined judgment criteria based on an image generated by an imaging device capturing a face of the driver; issuing a warning to the driver when it is judged that the driver is driving distracted; and changing the judgment criteria when an emergency warning light mounted in the vehicle is turned on.

(10) A non-transitory recording medium having recorded thereon a computer program, the computer program causing a computer to: judge whether a driver of a vehicle is driving distracted by a predetermined judgment criteria based on an image generated by an imaging device capturing a face of the driver; issue a warning to the driver when it is judged that the driver is driving distracted; and change the judgment criteria when an emergency warning light mounted in the vehicle is turned on.

According to the present disclosure, it is possible to suppress unnecessary warnings when issuing warnings about distracted driving of a driver.

DESCRIPTION OF EMBODIMENTS

Figure 1:
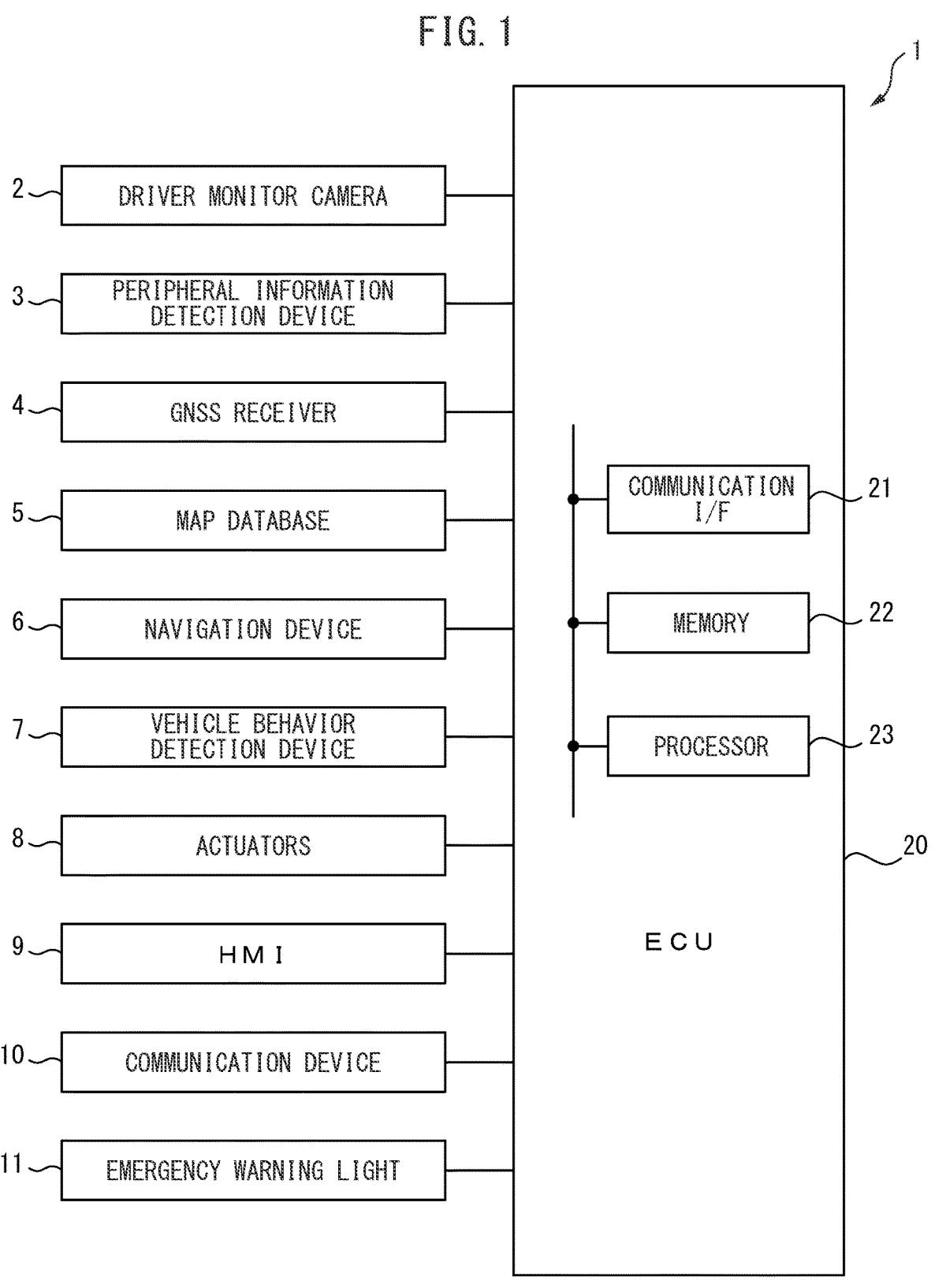
FIG. 1 is a schematic view of the configuration of a vehicle control system including a driver monitoring device according to a first embodiment of the present disclosure.

Hereinafter, embodiments of the present disclosure will be described in detail with reference to the drawings. In the following descriptions, the same reference numerals are given to the same constituent elements.

First Embodiment

Hereinafter, a first embodiment of the present disclosure will be described referring to FIG. 1 to FIG. 5. FIG. 1 is a schematic view of the configuration of a vehicle control system 1 including a driver monitoring device according to a first embodiment of the present disclosure. The vehicle control system 1 is mounted on a vehicle and executes various types of control of the vehicle.

As shown in FIG. 1, the vehicle control system 1 includes a driver monitor camera 2, a peripheral information detection device 3, a GNSS (Global Navigation Satellite System) receiver 4, a map database 5, a navigation device 6, a vehicle behavior detection device 7, actuators 8, a human machine interface (HMI) 9, a communication device 10, an emergency warning light 11 and an electronic control unit (ECU) 20. The driver monitor camera 2, the peripheral information detection device 3, the GNSS receiver 4, the map database 5, the navigation device 6, the vehicle behavior detection device 7, the actuators 8, the HMI 9, the communication device 10 and the emergency warning light 11 are electrically connected to the ECU 20 via an in-vehicle network compliant with standards such as CAN (Controller Area Network), etc.

The driver monitor camera 2 captures a face of the driver of the vehicle and generates an image representing the face of the driver. The output of the driver monitor camera 2, i.e., the image generated by the driver monitor camera 2, is transmitted to the ECU 20. A specific example of the configuration of the driver monitor camera 2 will be described below.

The driver monitor camera 2 has a camera and a projector. The camera is comprised of a lens and an imaging element and is for example a CMOS (complementary metal oxide semiconductor) camera or a CCD (charge coupled device) camera. The projector is an LED (light emitting diode) and for example includes two near infrared LEDs arranged at the two sides of the camera. By firing near infrared light at a driver, it is possible to capture an image of the driver without irritating the driver even at night time and other times of low illumination. Further, a bandpass filter for removing light of a wavelength component other than the near infrared may be provided at the inside of the camera, while a visible light cut filter for removing light of a red wavelength component emitted from a near infrared LED may be provided at the front surface of the projector.

Figure 2:
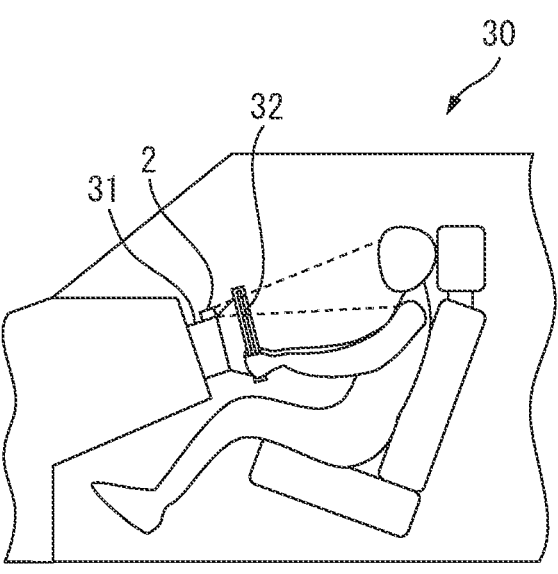
FIG. 2 is a view schematically showing an inside of a vehicle at which a driver monitor camera is provided.

FIG. 2 is a view schematically showing an inside of a vehicle 30 at which the driver monitor camera 2 is provided. The driver monitor camera 2 is provided at the inside of the passenger compartment of the vehicle 30 so as to capture an image of the driver of the vehicle 30. For example, as shown in FIG. 2, the driver monitor camera 2 is provided at the top part of a steering column 31 of the vehicle 30. FIG. 2 shows the range of projection of the driver monitor camera 2 by broken lines. Note that, the driver monitor camera 2 may be provided at a steering wheel 32, a room mirror, an instrument panel, an instrumentation hood, etc., of the vehicle 30. The driver monitor camera 2 is one example of an imaging device for capturing a face of a driver.

The peripheral information detection device 3 acquires data (images, point cloud data, etc.) around the vehicle 30 and detects peripheral information (for example, peripheral vehicles, lanes, pedestrians, bicycles, traffic lights, signs, etc.) of the vehicle 30. For example, the peripheral information detection device 3 includes a camera (monocular camera or stereo camera), a millimeter-wave radar, a LIDAR (Laser Imaging Detection And Ranging) or an ultrasonic sensor (sonar), or any combination thereof. Note that the peripheral information detection device 3 may further include an illuminance sensor, a rain sensor, etc. The output of the peripheral information detection device 3, i.e., the peripheral information of the vehicle 30 detected by the peripheral information detection device 3 is transmitted to the ECU 20.

The GNSS receiver 4 detects the present position of the vehicle 30 (for example, the latitude and longitude of the vehicle 30) based on positioning information obtained from a plurality of (for example, three or more) positioning satellites. Specifically, the GNSS receiver 4 captures a plurality of positioning satellites and receives radio waves transmitted from the positioning satellites. Then, the GNSS receiver 4 calculates the distance to each of the positioning satellites based on the difference between the transmission time and the reception time of the radio wave, and detects the present position of the vehicle 30 based on the distance to the positioning satellite and the position (orbit information) of the positioning satellite. The output of the GNSS receiver 4, i.e., the present position of the vehicle 30 detected by the GNSS receiver 4, is transmitted to the ECU 20. The GPS (Global Positioning System) receiver is an example of the GNSS receiver.

The map database 5 stores map information. The ECU 20 acquires map information from the map database 5. Note that the map database may be provided at the outside of the vehicle 30 (for example, a server etc.), and the ECU 20 may acquire map information from the outside of the vehicle 30.

The navigation device 6 sets a driving route of the vehicle 30 to the destination based on a current position of the vehicle 30 detected by the GNSS receiver 4, map information of the map database 5, input by occupants of the vehicle 30 (for example, the driver), etc. The driving route set by the navigation device 6 is sent to the ECU 20.

The vehicle behavior detection device 7 detects behavior information of the vehicle 30. The vehicle behavior detection device 7 includes, for example, a vehicle speed sensor for detecting the speed of the vehicle 30, a yaw rate sensor for detecting a yaw rate of the vehicle 30, etc. The output of the vehicle behavior detection device 7, that is, the behavior information of the vehicle detected by the vehicle behavior detection device 7, is sent to the ECU 20.

The actuators 8 enable the vehicle 30 to operate. For example, the actuators 8 include drive devices for acceleration of the vehicle 30 (for example, at least one of an internal combustion engine and an electric motor), a brake actuator for braking (decelerating) the vehicle 30, a steering actuator for steering the vehicle 30, etc. The ECU 20 controls the actuators 8 to control the behavior of the vehicle 30.

The HMI 9 transfers information between the vehicle 30 and occupants of the vehicle 30 (for example, the driver). The HMI 9 has an output part for providing information to occupants of the vehicle 30 (for example, display, speakers, light source, vibration unit, etc.) and an input part to which information is input by occupants of the vehicle 30 (for example, touch panel, operating buttons, operating switches, microphone, etc.) The output of the ECU 20 is notified through the HMI 9 to the occupants of the vehicle 30, while input from the occupants of the vehicle 30 is sent through the HMI 9 to the ECU 20. Note that, input/output terminals of the occupants of the vehicle 30 (smartphones, tablet terminals, etc.) may be connected by cables or wirelessly to the ECU 20 to be able to communicate and may function as the HMI 9. Further, the HMI 9 may be integrated with the navigation device 6. The HMI 9 is one example of an input device, an output device, or an input/output device.

The communication device 10 can communicate with the outside of the vehicle 30 and enables communication of the vehicle 30 with the outside of the vehicle 30. For example, the communication device 10 includes a wide area wireless communication module enabling wide area wireless communication between the vehicle 30 and the outside of the vehicle 30 (for example, a server) through a communication network such as a carrier network and the Internet. The ECU 20 communicates with the outside of the vehicle 30 through the communication device 10.

The emergency warning light 11 is turned on manually by the driver or is automatically turned on by the ECU 20 for the purpose of prompting attention of the drivers of peripheral vehicles etc. The emergency warning light 11 is also called a "hazard light". The on/off state of the emergency warning light 11 is sent to the ECU 20.

The ECU 20 performs various controls of the vehicle. As shown in FIG. 1, the ECU 20 includes a communication interface 21, a memory 22 and a processor 23. The communication interface 21 and the memory 22 are connected to the processor 23 via signal lines. In the present embodiment, one ECU 20 is provided, but a plurality of ECUs may be provided for each function.

The communication interface 21 has an interface circuitry for connecting the ECU 20 to the in-vehicle networking. The ECU 20 is connected to other in-vehicle devices via the communication interface 21.

The memory 22 includes, for example, a volatile semiconductor memory and a non-volatile semiconductor memory. The memory 22 stores programs, data, etc., used when various kinds of processing are executed by the processor 23.

The processor 23 includes one or more CPU (Central Processing Unit) and its peripheral circuitry. Note that the processor 23 may further include an arithmetic circuit such as a logical arithmetic unit or a numerical arithmetic unit.

In the present embodiment, a driver assistance function for assisting operation of the vehicle 30 by the driver is mounted in the vehicle 30. The driver assistance function mounted in the vehicle 30 is for example the "advanced driver assistance technology" ("advanced drive"). The advanced driver assistance technology is a driver assistance function automatically controlling driving of the vehicle 30 on a highway under the supervision of the driver. Therefore, if the advanced driver assistance technology is operating, the ECU 20 uses the actuators 8 etc., to autonomously regulate driving of the vehicle 30.

When the duty of supervision is imposed on the driver like at the time of operation of the driver assistance function, it is necessary to monitor the state of the driver and issue a warning to the driver in accordance with need. Further, even in the case of manual operation where all of the acceleration, deceleration (braking), and steering of the vehicle 30 are performed by the driver, it is desirable to monitor if the driver is suitably checking the surroundings.

Figure 3:
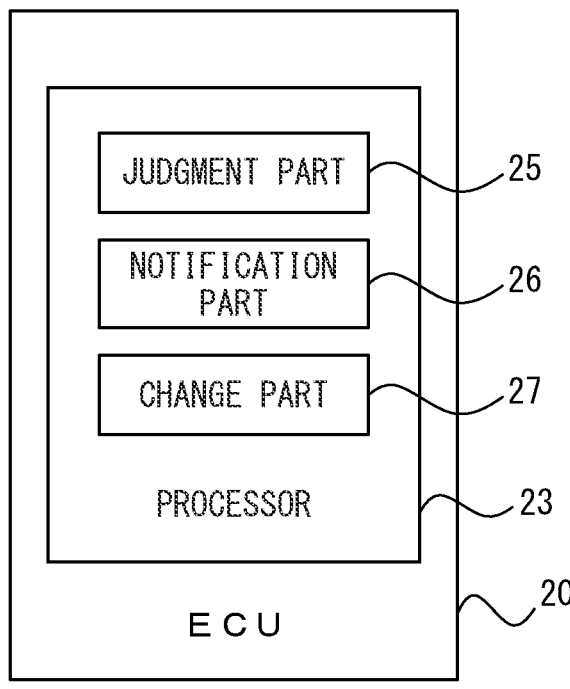
FIG. 3 is a functional block diagram of a processor of an ECU in the first embodiment.

In the present embodiment, the ECU 20 provided at the vehicle 30 functions as a driver monitoring device for monitoring the driver of the vehicle 30. FIG. 3 is a functional block diagram of the processor 23 of the ECU 20 in the first embodiment. In the present embodiment, the processor 23 has a judgment part 25, notification part 26, and change part 27. The judgment part 25, the notification part 26, and the change part 27 are function modules realized by a computer program stored in the memory 22 of ECU 20 and being run by the processor 23 of the ECU 20. Note that, these function modules may respectively be realized by dedicated processing circuits provided at the processor 23.

The judgment part 25 judges whether the driver is driving distracted using predetermined judgment criteria based on an image generated by the driver monitor camera 2 (below, referred to as the "monitoring image". The notification part 26 issues a warning to the driver if it is judged by the judgment part 25 that the driver is driving distracted. By doing this, it is possible to prompt the driver to pay attention to the road ahead and in turn improve the safety of the vehicle 30.

However, in a situation such as when the emergency warning light 11 is turned on in the vehicle 30, the driver has to look in the side direction to determine the surrounding situation. If a warning is issued for such a suitable action, determination of the surrounding situation by the driver will be obstructed or the driver is liable to be irritated by the warning.

Therefore, in the present embodiment, the change part 27 changes the judgment criteria for detecting distracted driving when the emergency warning light 11 is turned on. By doing this, it is possible to suitably detect distracted driving of the driver and possible to suppress unnecessary warnings to the driver. In the present embodiment, the judgment part 25 detects the angle of the facial direction or the line of sight of the driver based on the monitoring image and judges that the driver is driving distracted if the angle satisfies a predetermined distracted driving judgment condition. The change part 27 changes the distracted driving judgment condition when the emergency warning light 11 is turned on.

The judgment part 25, for example, matches the monitoring image with the facial shape data when the driver is facing the front so as to detect the angle of the facial orientation of the driver. Specifically, the judgment part 25 rotates the monitoring image so that the rate of match of the two becomes the maximum and detects the rotational angle when the rate of match becomes maximum as the angle of the facial orientation of the driver. The facial shape data is stored in advance in the memory 22 of the ECU 20 or in another storage device. The facial shape data may be data of the faces of general people or may be acquired for each driver.

Note that, the judgment part 25 may match the monitoring image with a plurality of the facial shape data with different facial orientations of the driver to thereby detect the angle of the facial orientation of the driver. In this case, the judgment part 25 detects the facial orientation of the facial shape data where the rate of match of the two becomes maximum as the angle of the facial orientation of the driver. The plurality of facial shape data is stored in advance in the memory 22 of the ECU 20 or in another storage device. The plurality of facial shape data may be data of the faces of general people or may be acquired for each driver.

Alternatively, the judgment part 25, for example, uses the following method to detect the angle of the line of sight of the driver. First, the judgment part 25 identifies the facial region from the monitoring image and extracts the features of the eyes, nose, mouth, and other parts of the face to thereby detect the facial parts. Next, the judgment part 25 detects the position of a purkinje image (corneal reflected image) and the position of the center of a pupil and detects the angle of the line of sight of the driver based on the positional relationship between the purkinje image and the center of the pupil. Note that, the judgment part 25 may detect the line of sight of the driver based on the positional relationship of the purkinje image and the center of the pupil, and the detected angle of the facial orientation of the driver.

Further, the judgment part 25 may use another technique to detect the angle of the facial orientation or line of sight of the driver. For example, the judgment part 25 may use a classifier trained in advance so as to output the angle of the facial orientation or line of sight of the driver from image data of the monitoring image so as to detect the angle of the facial orientation or line of sight of the driver. As one example of such a classifier, a neural network, support vector machine, random forest, or other machine learning model may be mentioned.

In the present embodiment, the distracted driving judgment condition is that the angle of the facial orientation or line of sight of the driver be outside of a threshold value range for greater than or equal to a threshold value time period. That is, the judgment part 25 judges that the driver is driving distracted when the angle of the facial orientation or line of sight of the driver is outside of the threshold value range for greater than or equal to the threshold value time period. In this case, the change part 27 lengthens the threshold value time period or broadens the threshold value range when the emergency warning light 11 is turned on.

Figure 4:
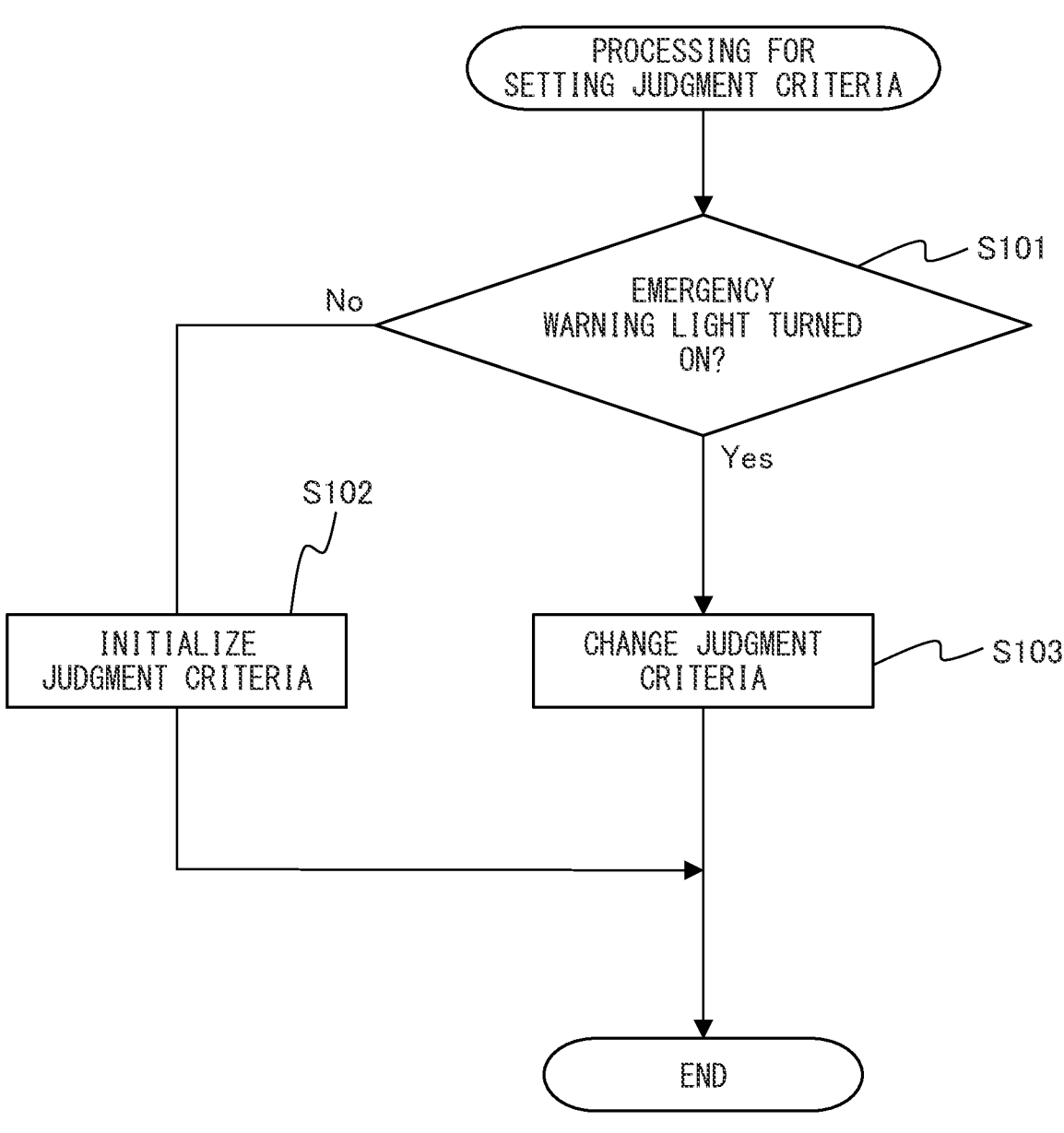
FIG. 4 is a flow chart showing a control routine of processing for setting judgment criteria in the first embodiment of the present disclosure.

Below, referring to FIG. 4 and FIG. 5, the above-mentioned control will be explained in detail. FIG. 4 is a flow chart showing a control routine of processing for setting judgment criteria in the first embodiment of the present disclosure. The present control routine is repeatedly performed by the processor 23 of the ECU 20 at predetermined execution intervals.

First, at step S101, the change part 27 of the processor 23 judges whether the emergency warning light 11 mounted in the vehicle 30 has been turned on. If it is judged that the emergency warning light 11 has not been turned on, the present control routine proceeds to step S102.

At step S102, the change part 27 initializes the judgment criteria for judging whether the driver is driving distracted. That is, the change part 27 sets the judgment criteria to a preset condition. For example, the change part 27 sets the threshold value time period and the threshold value range to initial values. Note that after step S102, the present control routine ends.

On the other hand, if at step S101 it is judged that the emergency warning light 11 has been turned on, the present control routine proceeds to step S103. At step S103, the change part 27 changes the judgment criteria from the initial values. Specifically, the change part 27 changes the judgment criteria so that it becomes harder for a driver to be judged to be driving distracted. For example, the change part 27 broadens the threshold value range if the judgment criteria to be changed is the threshold value range, and lengthens the threshold value time period if the judgment criteria to be changed is the threshold value time period. Note that, the change part 27 may broaden just the threshold value range in the left-right direction without broadening the threshold value range in the up-down direction. After step S103, the present control routine ends.

Figure 5:
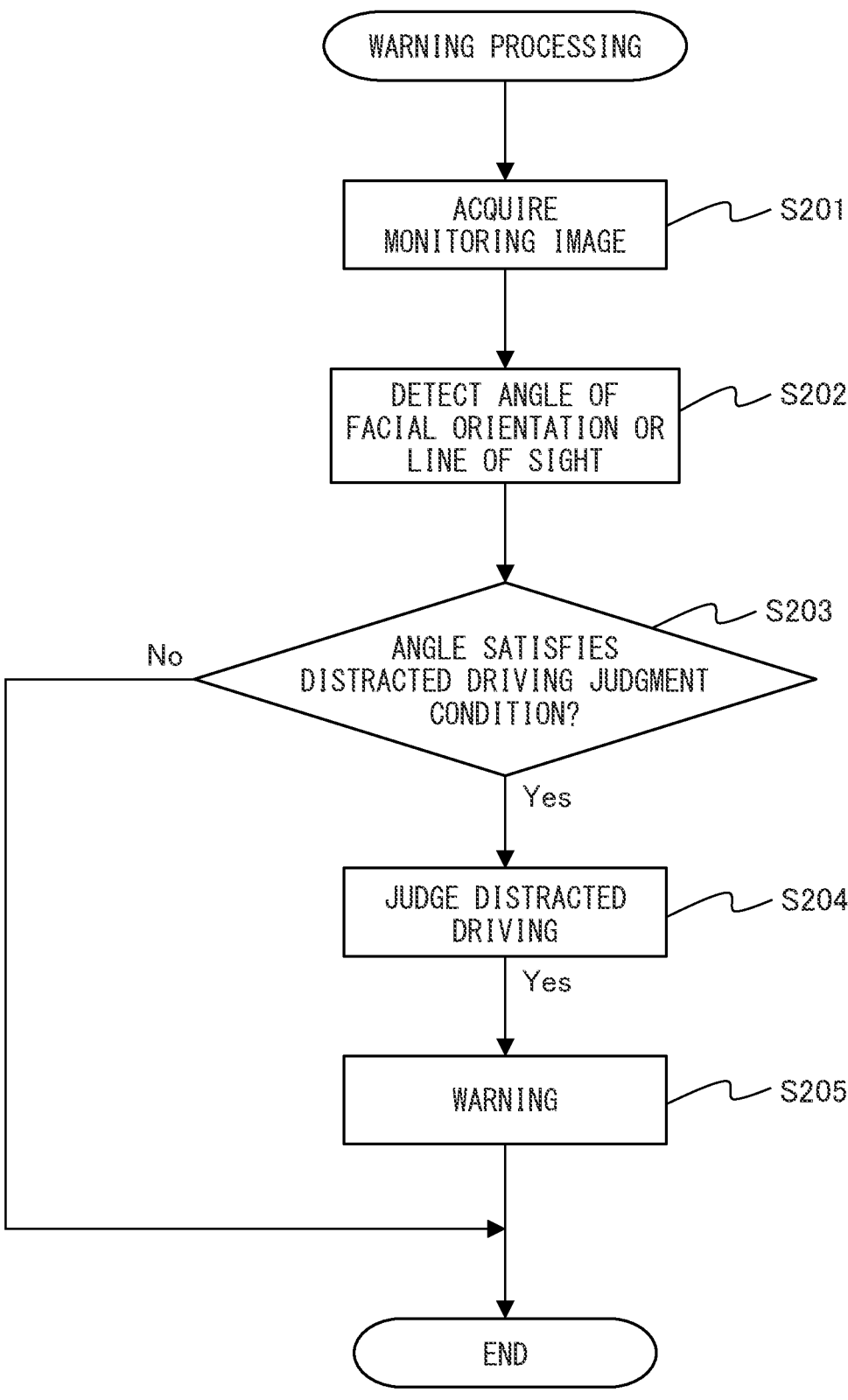
FIG. 5 is a flow chart showing control of warning processing in the first embodiment of the present disclosure.

FIG. 5 is a flow chart showing a control routine of warning processing in the first embodiment of the present disclosure. The present control routine is repeatedly performed by the processor 23 of the ECU 20 at predetermined execution intervals.

First, at step S201, the judgment part 25 of the processor 23 acquires a monitoring image. The monitoring image is repeatedly generated by the driver monitor camera 2 at predetermined imaging periods (for example $\frac{1}{30}$ second to $\frac{1}{10}$ second). The judgment part 25 acquires the monitoring image from the driver monitor camera 2.

Next, at step S202, the judgment part 25 uses the method such as explained above to detect the angle of the facial orientation or light of sight of the driver based on the monitoring image.

Next, at step S203, the judgment part 25 judges whether the angle of the facial orientation or light of sight of the driver satisfies the distracted driving judgment condition. In the present embodiment, the judgment part 25 judges that the angle of the facial orientation or line of sight of the driver satisfies the distracted driving judgment condition if the angle of the facial orientation or line of sight of the driver is outside the threshold value range for greater than or equal to the threshold value time period. At this time, as the threshold value time period and the threshold value range, the values set in the control routine of FIG. 4 are used. If at step S203 it is judged that the angle does not satisfy the distracted driving judgment condition, the present control routine ends.

On the other hand, if at step S203 it is judged that the angle satisfies the distracted driving judgment condition, the present control routine proceeds to step S204. At step S204, the judgment part 25 judges that the driver is driving distracted.

Next, at step S205, the notification part 26 of the processor 23 issues a visual, audio, or tactile warning to the driver through the HMI 9. An example of a visual warning is a warning message or a warning image shown on the display of the HMI 9 or a warning light emitted from a light source of the HMI 9 etc. An example of an audio warning is a verbal warning or a warning sound etc., output from the speaker of the HMI 9. An example of a tactile warning is vibration output from a vibration unit of the HMI 9 (for example, vibration of the steering wheel 32 or seat belt) etc. Note that, the notification part 26 may issue two or more types of warnings (for example visual warnings and audio warnings) to the driver. After step S205, the present control routine is ended.

Note that, the distracted driving judgment condition at step S203 may be that the frequency by which the angle of the facial orientation or line of sight of the driver becomes outside of the threshold value range be equal to or greater than a predetermined value. In this case, at step S103 of FIG. 4, the change part 27 increases this predetermined value as the judgment criteria. Further, the change part 27 may change the judgment criteria so that whether the driver is driving distracted is not judged when the emergency warning light 11 is turned on. In this case, if it is judged at step S101 that the emergency warning light 11 is turned on, the control routine of the warning processing of FIG. 5 is not executed.

Further, the judgment part 25 may use a classifier trained in advance so as to output any distracted driving of the driver from image data of the monitoring image so as to judge whether the driver is driving distracted. In this case, for example, the classifier corresponds to the judgment criteria, and the change part 27 changes the classifier used for the judgment when the emergency warning light 11 is turned on. In other words, the change part 27 selects a different classifier in accordance with the on/off state of the emergency warning light 11. Further, in this case, the change part 27 may change the judgment criteria so that whether the driver is driving distracted is not judged when the emergency warning light 11 is turned on.

Second Embodiment

The driver monitoring device according to the second embodiment is basically similar in configuration and control to the driver monitoring device according to the first embodiment except for the points explained below: For this reason, below, the second embodiment of the present disclosure will be explained focusing on parts different from the first embodiment.

Even if the emergency warning light 11 is turned on at the vehicle 30, the need for determining the surrounding situation will differ depending on the driving environment at that time. Therefore, in the second embodiment, when the emergency warning light 11 is turned on, the change part 27 changes the judgment criteria based on at least one of the positional information and peripheral information of the vehicle 30. By doing this, it is possible to use judgment criteria corresponding to the driving environment and more suitably detect distracted driving of the driver.

Figure 6:
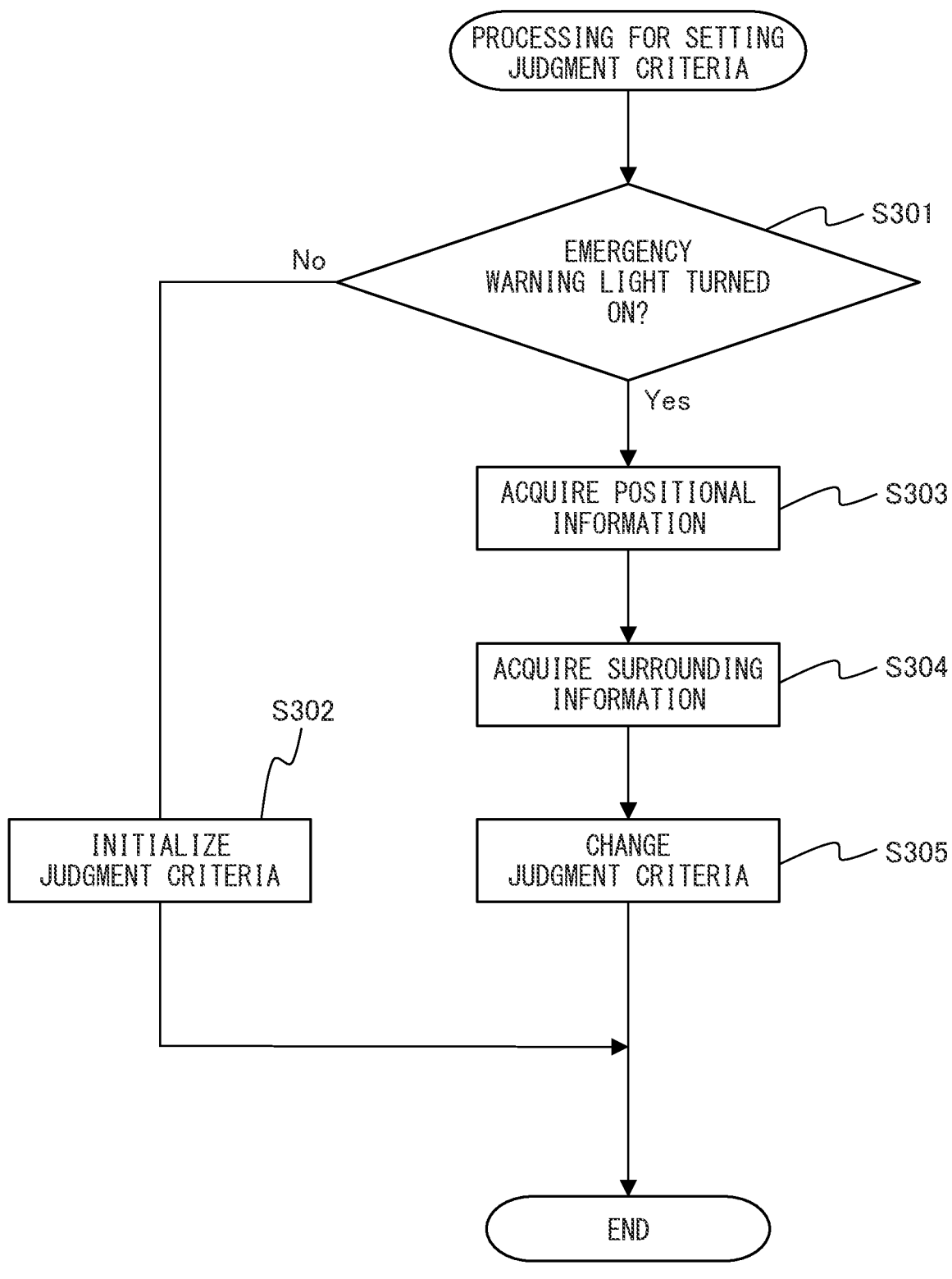
FIG. 6 is a flow chart showing a control routine of processing for setting judgment criteria in a second embodiment of the present disclosure.

FIG. 6 is a flow chart showing a control routine of processing for setting judgment criteria in the second embodiment of the present disclosure. The present control routine is repeatedly performed by the processor 23 of the ECU 20 at predetermined execution intervals.

Step S301 and S302 are performed in the same way as steps S101 and S102 of FIG. 4. If at step S301 it is judged that the emergency warning light 11 is turned on, the present control routine proceeds to step S303.

At step S303, the change part 27 of the processor 23 acquires the positional information of the vehicle 30. The positional information of the vehicle 30 is, for example, the current position of the vehicle 30 detected by the GNSS receiver 4. The change part 27 compares the current position of the vehicle 30 against map information of the map database 5 to thereby discriminate the type of the road on which the vehicle 30 is running (highway, general road, etc.)

Next, at step S304, the change part 27 acquires peripheral information of the vehicle detected by the peripheral information detection device 3. For example, the change part 27 calculates the number of peripheral vehicles located around the vehicle 30 based on the peripheral information of the vehicle 30. Further, the change part 27 may judge whether there is any stationary object (broken down vehicle, fallen object, etc.) present ahead of the vehicle 30 based on the peripheral information of the vehicle 30.

Next, at step S305, the change part 27 changes the judgment criteria from the initial value based on the positional information and the peripheral information of the vehicle 30. For example, the change part 27 broadens the threshold value range if the judgment criteria to be changed is the threshold value range, and lengthens the threshold value time period if the judgment criteria to be changed is the threshold value time period.

At a highway, compared with roads other than highways, fast check of the surroundings is demanded. For this reason, the change part 27 changes the judgment criteria so that it becomes harder to judge the driver is driving distracted when the vehicle 30 is running on a highway compared to when the vehicle 30 is not running on a highway. By doing this, it is possible to keep unnecessary warnings from obstructing a driver's check of the surroundings in high urgency situations. For example, the change part 27 increases the difference from the initial value of the threshold value range or the threshold value time period when the vehicle 30 is running on a highway compared to when the vehicle 30 is not running on a highway. Note that, the change part 27 may broaden the threshold value range or lengthen the threshold value time period if the vehicle 30 is not running on a highway and may change the judgment criteria so that whether the driver is driving distracted is not judged when the vehicle 30 is running on a highway.

Further, when the number of peripheral vehicles is large such as at the time of congestion, more sophisticated check of the surroundings is demanded compared with when the number of peripheral vehicles is small. For this reason, the change part 27 changes the judgment criteria so that it becomes harder for a driver to be judged to be driving distracted when the number of peripheral vehicles located around the vehicle 30 is large compared to when the number of peripheral vehicles is small. By doing this, it is possible to keep unnecessary warnings from obstructing a driver's check of the surroundings in situations where a high burden is placed on the driver for checking the surroundings. For example, the change part 27 increases the difference from the initial value of the threshold value range or the threshold value time period, the greater the number of peripheral vehicles. Note that, the change part 27 may broaden the threshold value range or lengthen the threshold value time period if the number of peripheral vehicles is less than a predetermined value and may change the judgment criteria so that whether the driver is driving distracted is not judged when the number of peripheral vehicles is greater than or equal to the predetermined value.

Further, fast check of the surroundings is demanded when there is a stationary object present ahead of the vehicle 30 compared to when there is no stationary object ahead of the vehicle 30. For this reason, the change part 27 may change the judgment criteria so that it becomes harder for it to be judged that the driver is driving distracted when there is a stationary object present ahead of the vehicle 30 compared to when there is no stationary object ahead of the vehicle 30. By doing this, it is possible to keep unnecessary warnings from obstructing a driver's check of the surroundings in situations of high urgency. For example, the change part 27 increases the difference from the initial value of the threshold value range or the threshold value time period when there is a stationary object present ahead of the vehicle 30 compared to when there is no stationary object present ahead of the vehicle 30. Note that, the change part 27 may broaden the threshold value range or lengthen the threshold value time period if there is no stationary object present ahead of the vehicle 30 and may change the judgment criteria so that whether the driver is driving distracted is not judged when there is a stationary object present ahead of the vehicle 30.

After step S305, the present control routine ends. Note that, at step S305, the change part 27 may change the judgment criteria based on another condition related to the positional information or peripheral information of the vehicle 30. Further, step S303 or S304 may be omitted and the change part 27 may change the judgment criteria based on one of the positional information and peripheral information of the vehicle 30.

In the second embodiment, the control routine of warning processing of FIG. 5 is performed in the same way as the first embodiment, and the judgment criteria set at the control routine of FIG. 6 is used at step S203 of FIG. 5. Note that, if the judgment criteria are changed so that when the driver is driving distracted is not judged in the control routine of FIG. 6, the control routine of the warning processing of FIG. 5 is not executed.

Other Embodiments

Above, embodiments according to the present disclosure were explained, but the present disclosure is not limited to these embodiments and can be corrected and changed in various ways within the scope of the claims.

For example, a part of the configuration of the vehicle control system 1 shown in FIG. 1 may be omitted. Further, the vehicle 30 may be a vehicle not having a driver assistance function.

Further, a server provided at the outside of the vehicle 30 may function as the driver monitoring device. In this case, an image generated by an imaging device such as the driver monitor camera 2 and a signal showing the on/off state of the emergency warning light 11 are sent through the communication network from the vehicle 30 to the server. When the judgment part of the server judges that the driver is driving distracted, the notification part of the server issues a warning to the driver through the ECU 20 of the vehicle 30.

Further, a computer program for realizing the functions of the parts of the processor 23 of the ECU 20 or the processor of the server by a computer may be provided in a form stored in a computer readable recording medium. The computer readable recording medium is, for example, a magnetic recording medium, an optical recording medium, or a semiconductor memory.

REFERENCE SIGNS LIST 2 driver monitor camera
11 emergency warning light
20 electronic control unit (ECU)
23 processor
25 judgment part
26 notification part
27 change part
30 vehicle

The invention claimed is:

1. A driver monitoring device comprising a processor configured to:
train a machine learning classifier to output an angle of a facial orientation or line of sight of a driver of a vehicle from an image data of a monitoring image so as to detect the angle of the facial orientation or line of sight of the driver;
change a predetermined judgment criteria for judging whether the driver of the vehicle is driving distracted when an emergency warning light mounted in the vehicle is turned on;
receive a monitoring image capturing a face of the driver of the vehicle,
judge whether the driver is distracted based on the changed predetermined judgment criteria and by detecting the angle of the facial orientation or line of sight of the driver output from the trained machine learning classifier to determine whether the angle satisfies a predetermined distracted driving judgment condition; and
issue a warning to the driver when it is judged that the driver is driving distracted.

2. The driver monitoring device according to claim 1, wherein
the distracted driving judgment condition is that the angle is outside a threshold value range for greater than or equal to a threshold value time period, and
the processor is configured to lengthen the threshold value time period or broaden the threshold value range when the emergency warning light is turned on.

3. The driver monitoring device according to claim 1, wherein the processor is configured to change the predetermined judgment criteria so that whether the driver is driving distracted is not judged when the emergency warning light is turned on.

4. The driver monitoring device according to claim 1, wherein the processor is configured to change the predetermined judgment criteria based on at least one of positional information and peripheral information of the vehicle when the emergency warning light is turned on.

5. The driver monitoring device according to claim 4, wherein the processor is configured to change the predetermined judgment criteria so that it becomes harder to judge that the driver is driving distracted when the vehicle is running on a highway compared to when the vehicle is not running on the highway.

6. The driver monitoring device according to claim 4, wherein the processor is configured to change the predetermined judgment criteria so that it becomes harder to judge that the driver is driving distracted when the number of peripheral vehicles located around the vehicle is large compared to when the number of the peripheral vehicles is small.

7. The driver monitoring device according to claim 4, wherein the processor is configured to change the predetermined judgment criteria so that it becomes harder to judge that the driver is driving distracted when there is a stationary object present ahead of the vehicle compared to when there is no stationary object present ahead of the vehicle.

8. A driver monitoring method performed by a computer, comprising:
training a machine learning classifier to output an angle of a facial orientation or line of sight of a driver of a vehicle from an image data of a monitoring image so as to detect the angle of the facial orientation or line of sight of the driver;

changing a predetermined judgment criteria for judging whether the driver of the vehicle is driving distracted when an emergency warning light mounted in the vehicle is turned on;

receiving a monitoring image capturing a face of the driver of the vehicle, judging whether the driver is driving distracted based on the changed predetermined judgment criteria and by detecting the angle of the facial orientation or line of sight of the driver output from the trained machine learning classifier to determine whether the angle satisfies a predetermined distracted driving judgment condition; and issuing a warning to the driver when it is judged that the driver is driving distracted.

9. A non-transitory recording medium having recorded thereon a computer program, the computer program causing a computer to:

train a machine learning classifier to output an angle of a facial orientation or line of sight of a driver of a vehicle from an image data of a monitoring image so as to detect the angle of the facial orientation or line of sight of the driver;

change a predetermined judgment criteria for judging whether the driver of the vehicle is driving distracted when an emergency warning light mounted in the vehicle is turned on;

receive a monitoring image capturing a face of the driver of the vehicle;

judge whether the driver is driving distracted based on the changed predetermined judgment criteria and by detecting the angle of the facial orientation or line of sight of the driver output from the trained machine learning classifier to determine whether the angle satisfies a predetermined distracted driving judgment condition; and issue a warning to the driver when it is judged that the driver is driving distracted.

* * * * *